June 15, 1971  O. SEPALL ET AL  3,585,106
APPARATUS FOR AUTOMATICALLY PRODUCING
TEST SHEETS FROM PAPERMAKING PULPS Filed Sept. 4, 1969  9 Sheets-Sheet 1

Inventors
Ola Sepall
Leonard N. Stanners
Bruno Tremblay

Weir, Marshall, MacRae & Lamb
Patent Agents

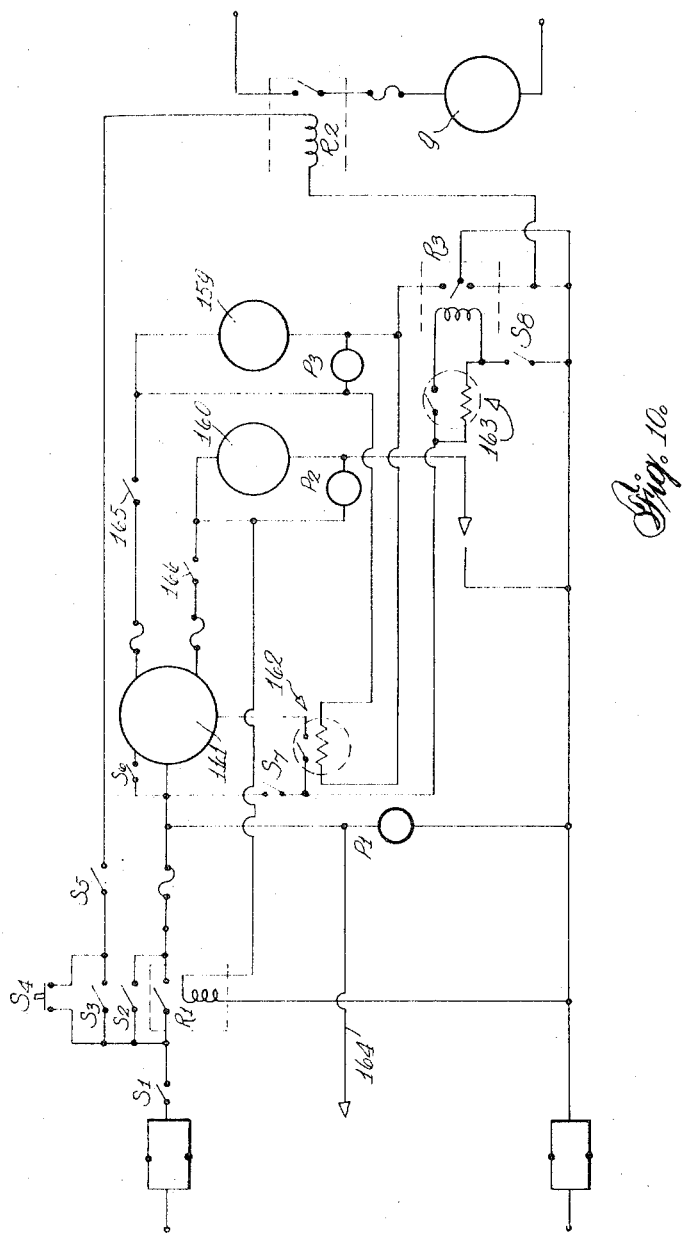

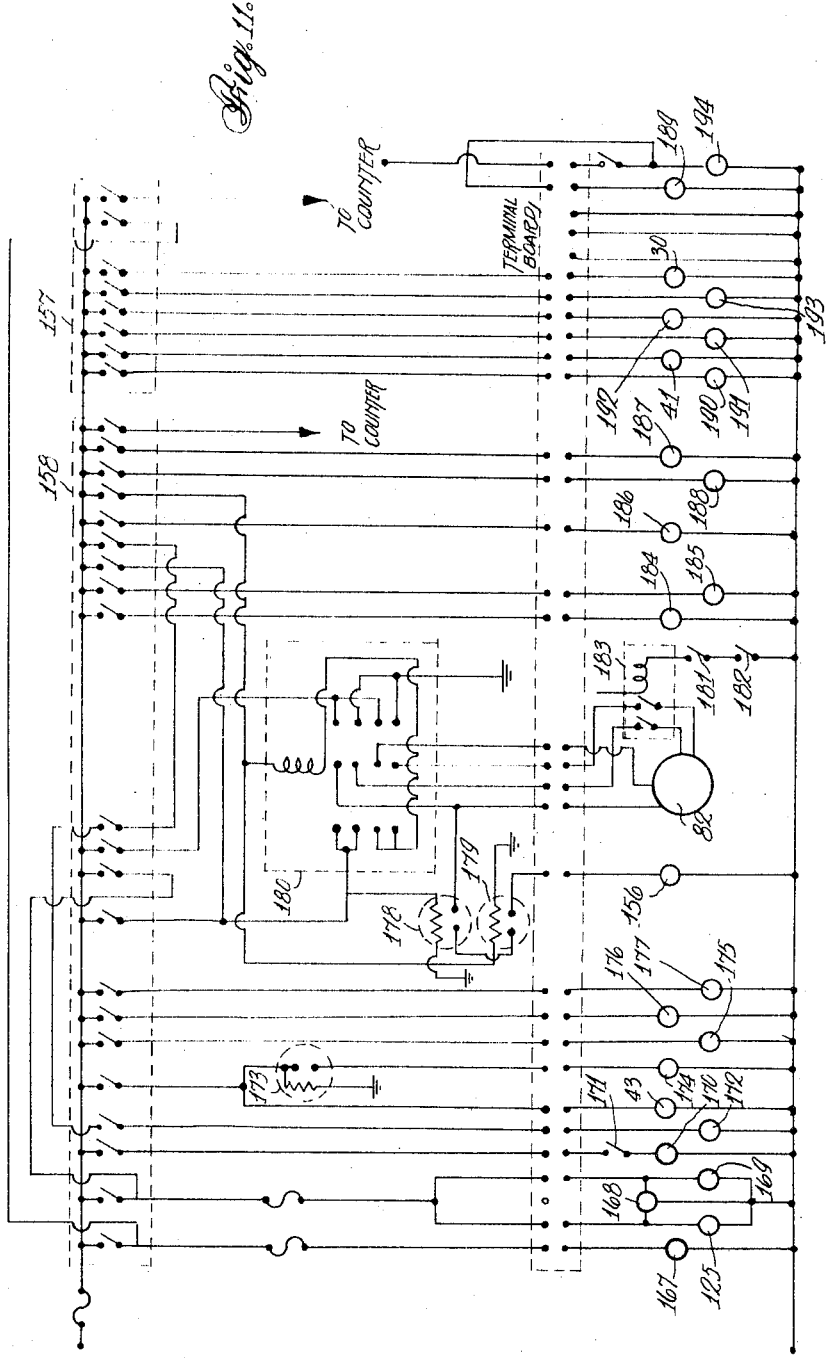

United States Patent Office 3,585,106
Patented June 15, 1971

3,585,106
APPARATUS FOR AUTOMATICALLY PRODUCING TEST SHEETS FROM PAPERMAKING PULPS
Ola Sepall, 220 Grande Allee; Leonard N. Stanners, 870 St. Louis Road; and Bruno Tremblay, 1141 Labarre, all of Quebec City, Quebec, Canada
Continuation-in-part of application Ser. No. 543,320, Apr. 18, 1966. This application Sept. 4, 1969, Ser. No. 855,348
Claims priority, application Canada, Jan. 24, 1966, 950,564
Int. Cl. D21f 13/00
U.S. Cl. 162—252　　　　　　　　　　　　　　　5 Claims

ABSTRACT OF THE DISCLOSURE

The invention relates to an automatic device for producing paper test sheets for evaluating physical properties of papermaking pulps. In the apparatus, there is arranged in a circular path a pick-up area for transferring an absorbent couching sheet, a test sheet forming screen, and a stacking area for depositing completed test sheets. A centrally located rotatable column has an extending arm with a flat, porous member attached thereto, suitably arranged so that the porous member can be consecutively positioned over the couch sheet pick-up position, the sheet forming position and the stacking position. Means are provided for applying a partial vacuum to the porous member to cause the couch sheet to adhere to it when effecting the transfer. A horizontally disposed conveyor means is utilized to supply a succession of pulp suspension containing beakers to a dumping station where they are individually emptied into a means which feeds each dumped aliquot to the test sheet forming screen for test sheet formation.

This application is a continuation-in-part of prior co-pending application Ser. No. 543,320, filed Apr. 18, 1966 (now Pat. No. 3,483,078).

The importance of routine evaluation of the physical properties of papermaking pulps was recognized many years ago. Such routine evaluation helps to provide knowledge of the papermaking qualities of pulp and gives information as to the strength characteristics imparted to paper by various pulps.

Pulp evaluation methods, and apparatus therefor, have become rather closely standardized in most major pulp and paper manufacturing countries. In general principle, they consist of making and testing handsheets under controlled conditions. The procedure entails the following five main steps, (i) Sampling and preparation of the pulp for sheet-making,
(ii) Forming of the sheet on a wire,
(iii) Couching the wet web from the wire onto blotters,
(iv) Wet pressing of the sheet for water removal, and
(v) Drying and conditioning the sheet prior to testing.

This procedure, requiring manual manipulation of the steps as presently practiced, is often inefficient, tedious and detrimental to the provision of accurate test results. For example, step (ii) may frequently lead to variations in properties (such as weight, formation, and the like) from sheet to sheet due to human error. Different operators, under the same conditions, will produce sheets of varying characteristics. Another disadvantage resides in the fact that sheets produced from certain types of pulp (such as groundwood and mechanical) tend to stick to the wire and thus it is difficult to couch the sheets. As a result, the operator must lift the sheet with his hands and this action may effect the characteristics of the sheet. Moreover, the standard technique of forming and couching the wet web is tedious, time-consuming and costly.

The invention resides in an apparatus for producing paper test sheets which includes a column rotatably mounted in a frame about a normally vertical axis. An arm is fixed to the frame for revolution by the column in a circular path. The arm has at its free end a vacuum chamber having a closed top wall and a perforate bottom wall. The circular path has arranged therebelow in sequence a couching sheet feeding station, a wet paper web feeding station, and a completed test sheet receiving station. Means are associated with column rotating means for arresting rotation at fixed intervals to cause stopping of the arm in succession at each of the stations. Means are provided at the couching sheet feeding station for placing an absorbent couching sheet in engagement with the perforate wall of the arm for adherence thereto by suction from the chamber. Means are provided at the web feeding station for placing a wet paper web in engagement with the absorbent couching sheet on the perforate wall for adhesion thereto. Means are provided for depositing the absorbent couching sheet and the paper web at the test sheet receiving station.

Figure 1:
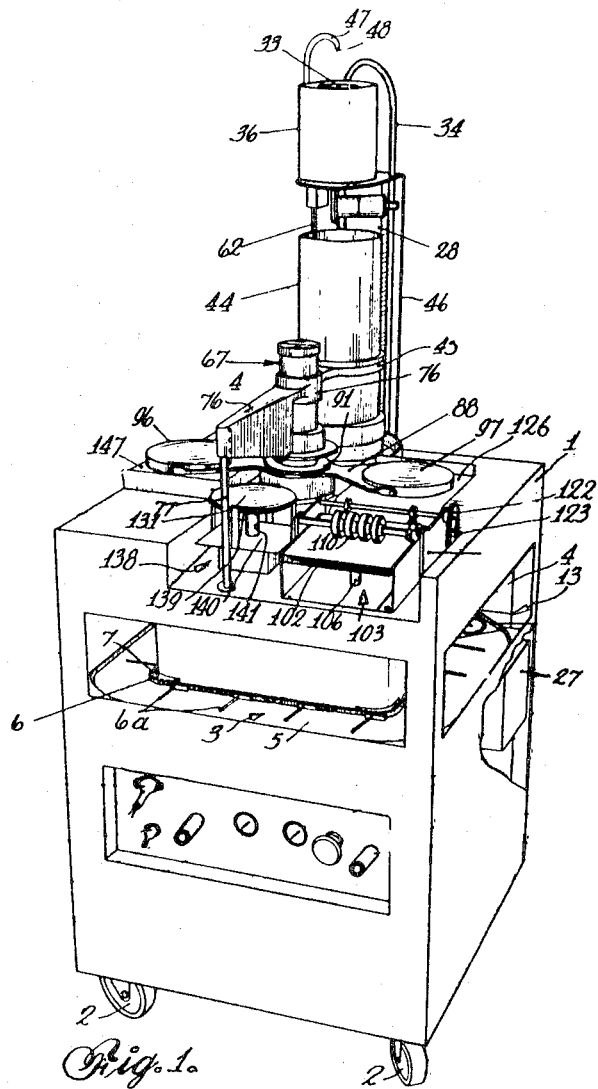
Figure 2:
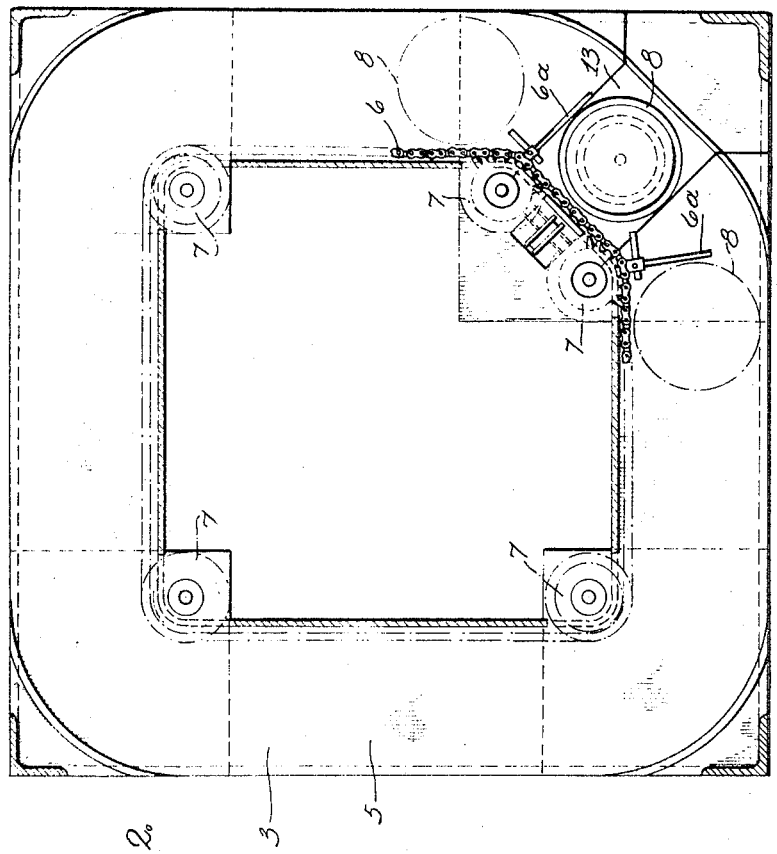
Figure 3:
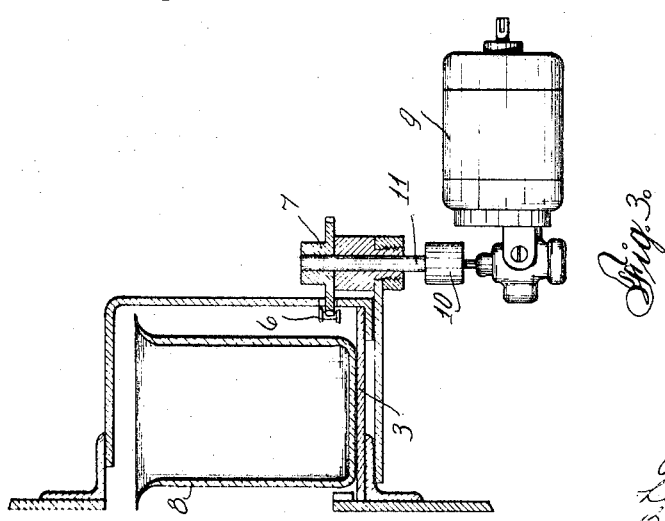
Figure 4:
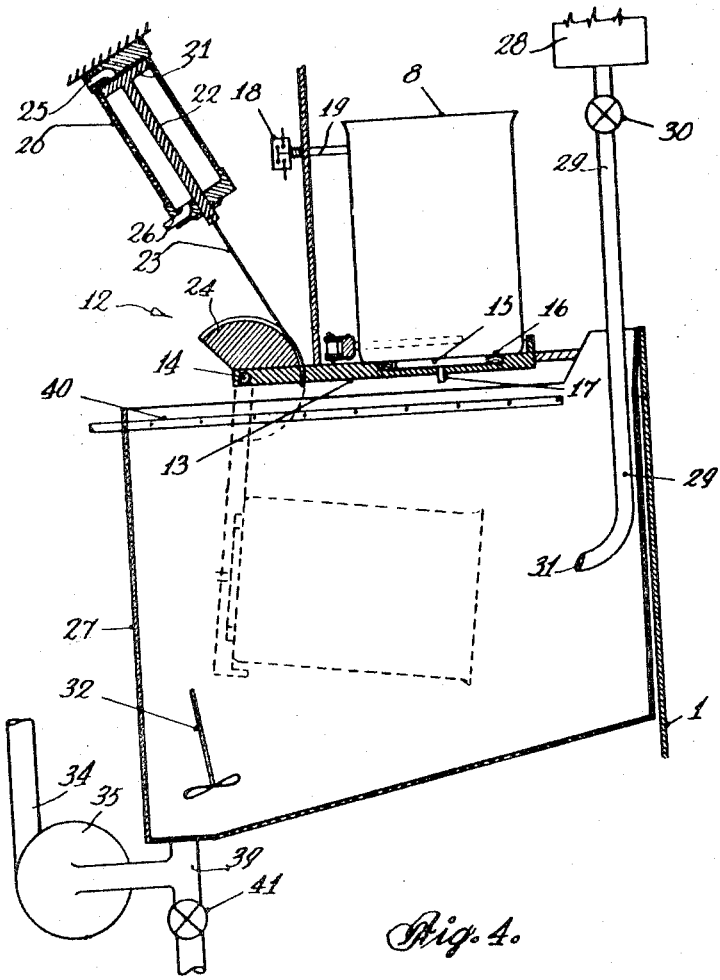
Figure 5:
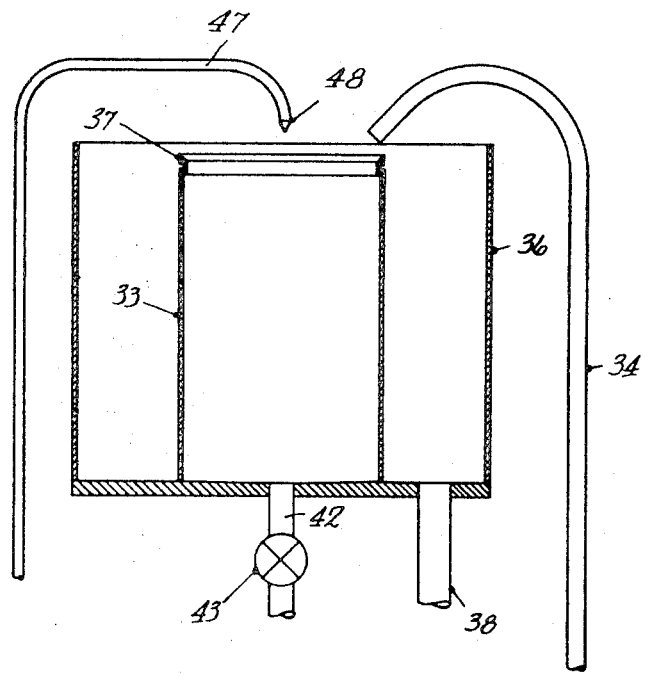
Figure 6:
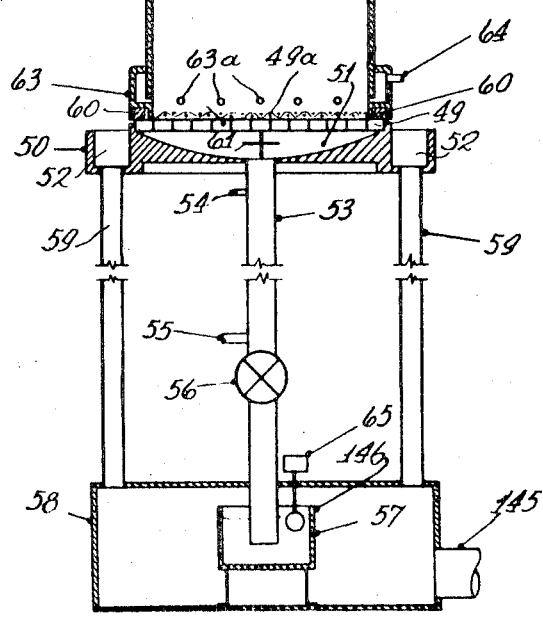
Figure 7:
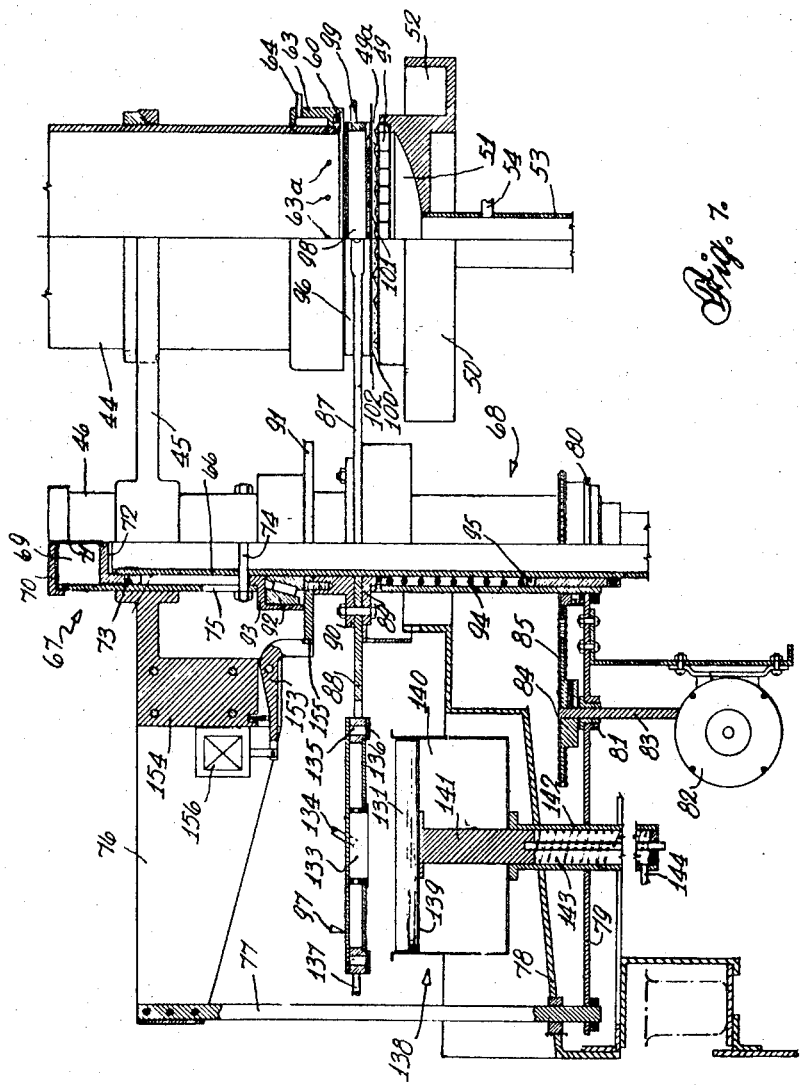
Figure 8:
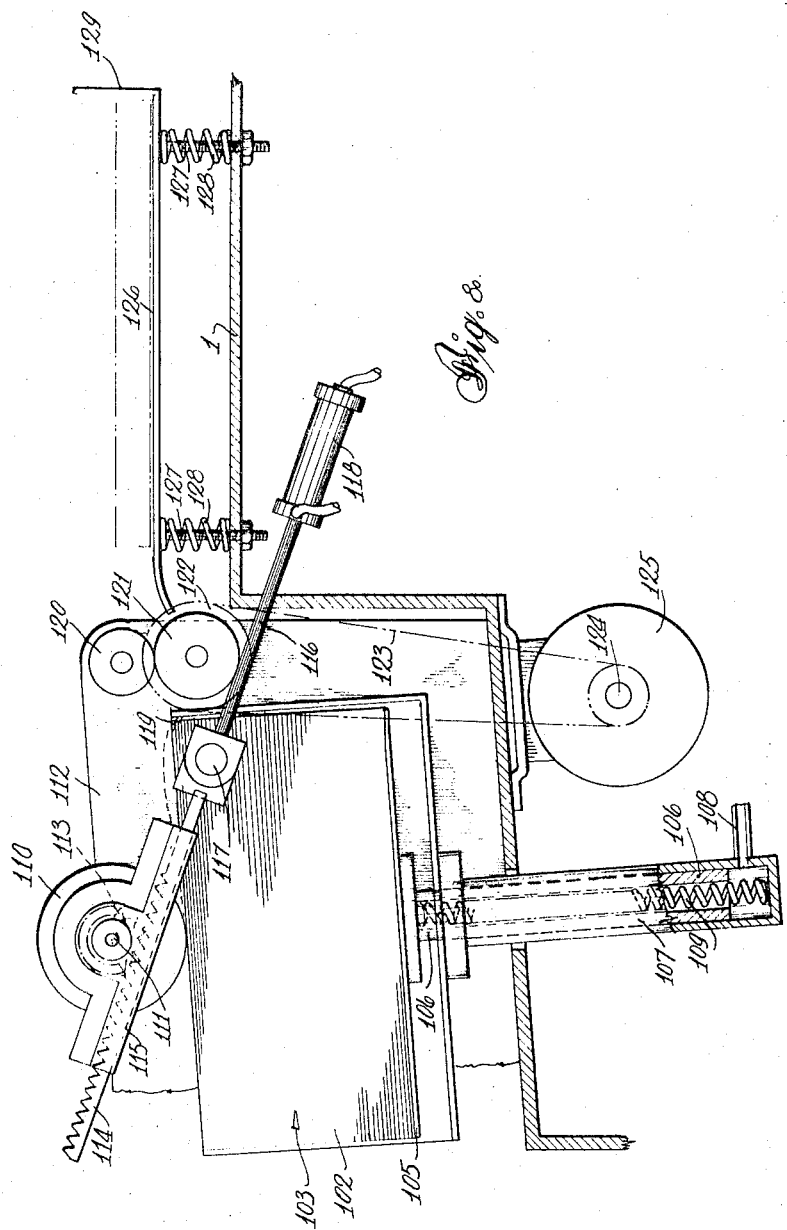
Figure 9:
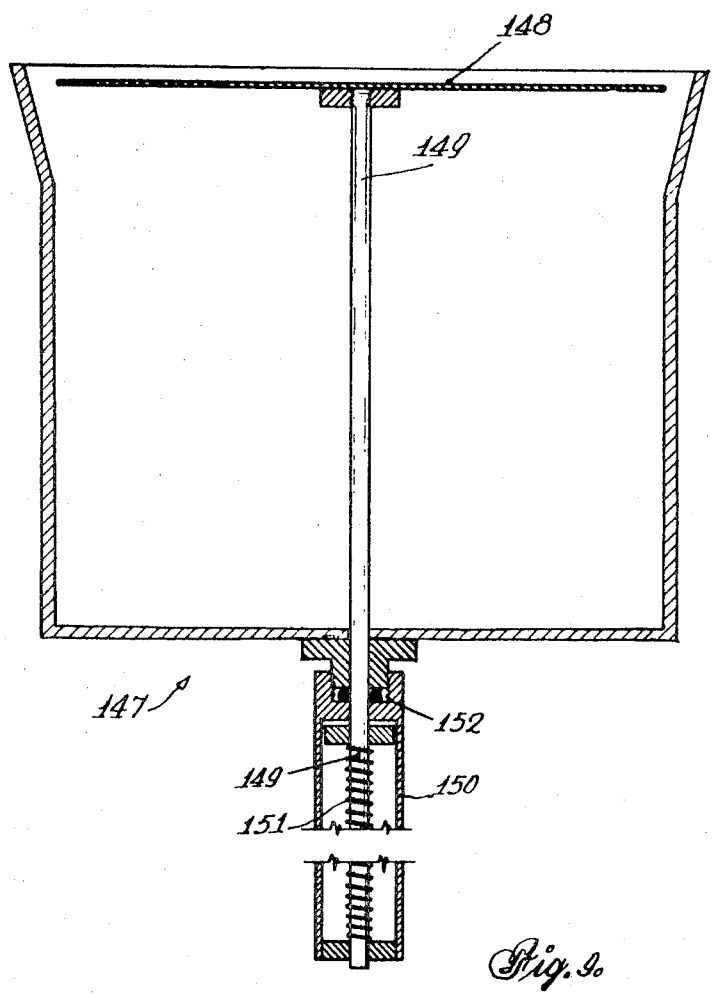

The invention will be described with reference to the accompanying drawings, in which FIG. 1 is a perspective view of an apparatus in accordance with the invention,
FIG. 2 is a sectional plan view showing a conveyor means,
FIG. 3 is a section on line 3—3 of FIG. 2,
FIG. 4 is a sectional elevation of a dumping device,
FIG. 5 is a sectional elevation of a measuring pot and related elements,
FIG. 6 is a sectional elevation of a sheet forming device,
FIG. 7 is a sectional elevation of the column and associated elements,
FIG. 8 is a sectional elevation of a blotter feeding device,
FIG. 9 is a sectional elevation of a stack receiving device,
FIG. 10 is a wiring diagram of an electrical power system for the apparatus, and
FIG. 11 is a wiring diagram of a control system for the apparatus.

The apparatus, as illustrated in the drawings, comprises a housing or cabinet 1 which may be provided with casters 2 for ease of movement thereof.

Means are provided for successively treating a plurality of pulp samples and such means comprises a platform 3 fixedly mounted in the housing and accessible through side wall openings 4. The platform has a recessed endless surface 5. A horizontally disposed endless conveyor comprises a chain 6 mounted on sprockets 7 and carrying a plurality of pushing arms 6a arranged to sweep the surface 5. One or more containers or breakers 8, each containing a sample of pulp to be tested, are adapted to be placed on the surface 5, each breaker being placed between a pair of adjacent arms 6a. It will be apparent that, on engagement of each beaker by an arm 6a, it will be pushed along surface 5.

The conveyor is driven in any suitable manner as by means of an electric motor 9 having a driving connection 10 with the shaft 11 of a sprocket 7.

Means are provided for dumping the stock from each beaker for formation of a sheet therefrom at a specified location. To this end, and referring to FIGS. 1 and 4, a dumping device 12 comprises a dumping section 13 of platforms 3 hingedly mounted on a pin 14. When the beaker arrives on section 13, it is firmly held thereon by means of vacuum in a chamber 15 under the bottom wall of the beaker and formed in part thereby. A circular rubber or like ring 16 under the beaker acts to seal the vacuum in chamber 15. Vacuum is applied through a line 17 communicating with the chamber. Electrical means for causing a vacuum pump to evacuate chamber 15 includes a switch 18 and switch actuating arm 19 engaged by the beaker when it moves onto section 13. Switch 18 also acts to stop the conveyor drive as well as to initiate an ensuing series of operations.

Means for swinging platform section 13 and the beaker thereon downwardly to discharge the contents of the beaker comprises an air cylinder 20 having a piston 21 therein and a piston rod 22. A flexible line 23 connects the piston rod with the section 13. For ease of operation, the line 23 may be trained over a segment 24 mounted on section 13. The piston 21 is reciprocated by air pressure applied to either side thereof through air connections 25 and 26. Air pressure normally acts on the lower side of the piston to maintain the section 13 in the plane of platform 3. This pressure is now released to cause downward movement of section 13 into a tank 27 mounted in housing 1 beneath the section. As shown in FIG. 4, this action dumps the contents of the beaker into tank 27.

Means are provided for adding dilution water to the stock in tank 27. Such means comprises a dilution water container 28 having a pipe 29 extending into tank 27 and through which water is fed by gravity on opening of a valve 30 therein. This valve automatically opens during the emptying operation of beaker 8. Pipe 29 terminates in a spout 31 immediately in front of the beaker mouth when the latter is in dumping position. This dilution water serves to flush the beaker of pulp and to dilute the pulp sample in the tank to desired consistency. An agitator 32 may be provided in tank 27 to provide mixing of the suspension therein and to ensure against settling of fibres. Container 28 is automatically filled with clean water to a constant volume during the draining and washing cycle of tank 27.

After dumping and flushing of beaker 8, pressure is again applied to piston 21 to return the dumper section 13 and the empty beaker to their original position. This action again trips switch 18 which de-energizes the dumping and diluting portion of the electrical circuit and initiates the sheet forming procedure. This second tripping of switch 18 also starts conveyor 6 which pushes the empty beaker off dumper 13 and positions the following beaker on the dumper in readiness for a second sample dumping. The latter dumping occurs only when the previous sample in tank 27 has been consumed in sheetmaking.

The diluted pulp in tank 27 is transferred into a measuring pot 33 mounted on the housing through a pipe 34 by means of a pump 35. Pot 33 (see FIG. 5) is located concentrically within an overflow vessel or receiver 36. The volume of pot 33 may be controlled whereby it can be made to contain a precisely determined volume of suspension by means of an adjustable sleeve 37 mounted on the mouth edge portion of the pot. The pumping cycle is of sufficient length always to transfer a volume of suspension greater than can be contained within pot 33. This results in an overflow from the pot into receiver 37 and ensures a reproducible and complete filling of the pot. The suspension overflowing into receiver 36 is returned by gravity to tank 27 through a drain pipe 38.

The remainder of the sample in tank 27 is discharged to waste through a drain pipe 39 and tank 27 is thoroughly washed by spraying clean wash water onto the interior walls thereof by means of a spray shower pipe 40. The wash water is discharged by gravity through pipe 39. A valve 41 in pipe 39 automatically opens on completion of the pumping step and closes on completion of the washing step. It will be apparent that, in any sequence of sheetforming steps, this washing of tank 27 will be the initial step, on energization of the machine, to ensure accurate results.

The fixed volume of suspension in measuring pot 33 is adapted to be emptied by gravity through a pipe 42 having a valve 43 therein into an open-ended cylindrical sheetmaking member 44 located directly below the pot and carried by an arm 45 fixed to a central column 46 mounted on the housing. During the emptying of pot 33, a spray of clean water is directed onto the walls of the pot, by means of pipe 47 and nozzle 48, in order to flush off adhering pulp fibers.

The actual handsheet forming device employed in the present invention is of generally conventional type but forms an automatically operating portion of the invention. The device, shown in FIGS. 6 and 7, comprises the member 44, previously mentioned, a grid plate 49 with wire 49a thereon disposed below the lower open end of the member, and a circular base 50 on which the grid plate is supported. Base 50 has a funnel-shaped depression or drainage chamber 51 therein disposed directly below grid plate 49 and an annular peripheral trough 52 located radially outwardly of the wall of member 44. A drainage pipe 53, having a valved air inlet 54, a valved water intake or water supply pipe 55, and a drainage pipe valve 56 therein, leads from the funnel depression or drainage chamber 51 into an overflow vessel 57 located in a sump 58. Drain pipes 59 lead from the trough 52 into the sump. A resilient gasket ring 60 provides sealing means at the lower edge portion of member 44. A baffle 61 is located in the funnel depression or drainage chamber 51 and the grid plate 49 is seated thereon.

In order to provide desired control in operation of the device, member 44 is provided with a liquid level control 62 and an annular air manifold 63 surrounding the lower end thereof. Manifold 63 has an air intake or air supply pipe 64 and a plurality of air outlet holes 63a leading into the member. Overflow vessel 57 is provided with a drainage determination detector 65.

Column 46 is a hollow cylinder mounted for raising and lowering movement on a center pipe 66 and has an upper section 67 (to which arm 45 is fixed) non-rotatively mounted on the pipe and a lower section 68 rotatively mounted on the pipe.

Lifting action is applied to the column by means of air pressure applied through pipe 66. The air under pressure is transmitted to a chamber 69 at the top of the column (which is closed by a cap 70) through a hole 71 in a seal holding cap 72 fixed to the top of pipe 66 and provided with a sealing ring 73. The amount of lifting movement of column 46 is controlled by a stationary stop pin 74 fixed to pipe 66 and extending through a slot 75 in the wall of column 46.

Fixed to column section 67 is an arm 76 which, as shown, extends in diagonally opposed relation to arm 45. A guide rod 77 fixed to arm 76 extends downwardly therefrom through a frame member 78 fixed to the housing. Fixed to guide rod 77 is a motor mounting plate 79 which is also supported on column section 68 as by a ring 80. Suspended from plate 9 as by a bracket 81 is a motor 82 arranged to drive a shaft 83 extending through plate 79. Shaft 83 drives a sprocket 84 and by means of chain 85 and sprocket 86 imparts rotation to column section 68.

Fixed to the upper end of section 68 are a pair of diagonally extending arms 87 and 88 by means of flanged collars 89 and 90. A disk 91 is fixed to the top edge of collar 90. A bearing 92 in housing 93 is mounted on disk 91. A coil spring 94 between column section 68 and pipe 66 and having its ends bearing on a sleeve 95 at the lower end of section 68 and collar 89 serves to urge section 68 upwardly towards section 67.

Arm 87 carries a couching head 96 and arm 88 carries a plate transfer head 97.

Couching head 96 comprises a shallow cylindrical housing having a chamber 98 therein to which vacuum may be applied through a flexible hose 99. The bottom wall 100 of the head has perforations 101 therein whereby, when chamber 98 is under vacuum, a porous, medium such as an absorbent paper sheet or blotter 102 is applied to the outer face of wall 100 will be held thereon.

A blotter separator and feeding device is provided and one suitable modification thereof is shown in detail in FIG. 8 and comprises a compartment or tray 103 mounted on the top of cabinet 1 and adapted to contain a stack of blotting sheets 102 which, as shown, are of square shape. The stack sits on a table 105 which is supported on a piston 106 in a cylinder 107 having an air intake 108. A tension spring 109 located inside the piston has one end attached to the base of cylinder 107 and the other end attached to table 105. The top of the stack is engaged by friction wheels 110. The spring 109 serves to maintain a constant pressure of the stack against wheels 110 as blotters are removed from the stack. The level of pressure of the blotter stack against wheels 110 is governed by air pressure applied to cylinder 107 through intake 108.

Means for separating the topmost blotter from the stack and initiating movement of it from the stack comprises the friction wheels 110 which are fixed to shaft 111 mounted in frame members 112. Rotation is imparted to the wheels 110 by means of a ratchet drive comprising a ratchet wheel 113 fixed to shaft 111, a ratchet bar 114 mounted in a support 115, a piston rod 116 pivotally connected to ratchet bar 114 at 117 and an air cylinder 118 for imparting movement to the bar 114.

Positive separation of the topmost blotter from the underlying one is achieved by means of filled corners 119; which cause the topmost blotter to bulge upwardly and away from the underlying one under the action of the wheels 110 (as shown in dotted lines in FIG. 8). After a certain degree of bulge, the leading edge of the topmost blotter pops out of compartment 103 and, under further action of wheels 110, is pushed into the nip of a pair of rollers 120 and 121. These latter rollers have surfaces of friction material such as rubber. Roller 121 is driven by means of a pulley 122, belt 123, pulley 124, and motor 125. Rollers 120 and 121 deposit the blotter engaged thereby onto a feeding table 126 which is resiliently supported on the cabinet by means of legs 127 and springs 128. The table has a stop 129 to position the blotter thereon.

Plate transfer head 97 comprises a shallow cylindrical member having in its lower surface a circular recess 130 adapted to receive a metal plate 131 from an underlying stack of such plates. Plate 131 is a smooth faced imperforate metal disc. Suitably it is of mirror-finished stainless steel. Each plate 131 fits snugly into recess 130 with its under surface substantially flush with the surrounding annular surface 132 of the head.

Means for holding plate 131 in recess 130 comprises a chamber 133 axially disposed in head 97 and to which vacuum may be applied through flexible hose 134.

Head 97 is also provided with an annular chamber 135 with communicating perforations 136 leading from surface 132. Vacuum may be applied to chamber 136 by means of flexible hose 137.

A plate feeder 138 comprises a table 139 adapted to support a stack of plates 131, a compartment 140 having walls serving to retain the plates of the stack in proper alignment, a piston 141 carrying the table 139, a cylinder 142 receiving the piston for reciprocal movement therein, a spring 143 in the cylinder resiliently supporting the piston, and an air intake 144 leading into the cylinder below the piston.

Also mounted on the top of the cabinet (see FIGS. 1 and 9) is a sheet stacking compartment 147 having therein a stacking table 148 carried by a rod 149, the lower end of which extends into a cylinder 150 and is spring-loaded therein by means of a spring 151. The spring loading arrangement is designed to minimize free fall distance of blotters and plates into the compartment to provide a neat stacking. The motion of rod 149 is damped by friction from a compressed O-ring 152 to prevent oscillation of the rod and table.

Referring to FIG. 1, it will be observed that there are four circumferentially arranged step-performing stations associated with rotative movement of the couching head 96 and the plate transfer head 97. These are (1) blotter feeding table 126, (2) couching location in alignment with member 44, (3) sheet stacking location in alignment with compartment 147, and (4) plate feeding location in alignment with plate feeder 138. As shown, stations (1) and (3) are in diametrically opposite relation and stations (2) and (4) are in diametrically opposite relation. In the position of FIG. 1, couching head 96 is located in station (1); that is, directly over blotter feeding table 126 and plate transfer head 97 is in station (3); that is, directly over compartment 147.

Continuing with the operative description of the apparatus with particular reference to the elements thus far set forth, it may be assumed that the member 44, at the beginning of the sheet forming operation, is in the raised position shown in FIG. 7; that is, with the bottom thereof approximately one inch above the grid plate wire.

With drainage pipe valve 56 closed, clean water is fed through intake 55 up through pipe 53 and flows through the grid plate 49 into the surrounding trough 52. The purpose of this step is to wash the grid plate wire of any adhering fibres possibly remaining from the previous sheet-forming cycle. The trough receiving the overflow drains through pipes 59 into sump 58 from which it flows to sewer through an outlet hole 145.

After about a five second washing period and with water still flowing into intake 55, the member 44 is automatically lowered (by means of a programmed lowering step of column 46) onto base 50 with the gasket ring 60 forming a circular seal between grid plate 49 and member 44.

Member 44 is now partially filled with water. When the water level is about halfway up, valve 43 opens, thus emptying the measured volume of dilute pulp suspension in measuring pot 33. The latter is simultaneously washed down by spray nozzle 48 as previously described.

When the level in member 44 reaches the 350 mm. mark above the grid plate wire, level controller 62 acts to close water supply pipe 55. Low pressure air is then automatically fed to manifold 63 through air supply pipe 64. From the manifold, air is distributed uniformly through port holes 63a into the member 44. The air issuing from these holes bubbles through the very dilute suspension in the member 44 and acts to agitate this suspension.

After approximately a five second agitation period, the air is cut off and a pause of about five seconds occurs during which time the surface of the suspension becomes almost motionless. Drainage pipe valve 56 is then automatically fully opened to allow the water of the suspension to drain through the grid plate, down pipe 53 and into the overflow receiver 57. During this drainage period, the pulp fibres are retained on the wire to form a mat. The overflow from the top of receiver 57 (which is 800 mm. below the wire) empties into sump 58 from which it is sewered through outlet 145.

The drainage period is continued until substantially all the water is drained and the level in receiver 57 drops about 10 mm. below the top thereof by means of a small hole 146 located in the wall thereof. This permits the float of detector 65 to sense the termination of the drainage period and to re-energize the programming cycle. Lifting of the float of detector 65 results in interruption of an electrical control circuit (to be later referred to) in order to provide a sufficient drainage period for pulps of different drainage characteristics whereby the apparatus may be employed for treating such different pulps without resetting of its controls.

It will be apparent that a plurality of handsheets may be formed successively from each beaker sample.

At the completion of the drainage step, column 46 (and all elements attached to it including member 44) is raised about one inch. Prior to this lifting action, heads 96 and 97 are in the position of FIG. 1. This lifting action is to permit access of the couching head 96 to the formed sheet and thus, with the parts as illustrated in FIG. 7, column section 68 is rotated counter-clockwise 90° to bring the couching head 96 directly over the wet sheet on grid plate 49. Preferably, exact positioning means for head 96 is provided and comprises, as shown in FIG. 7, a locking detent 153 pivotally mounted on frame member 154 and receivable in a notch 155 in disc 91. Actuation of detent 153 is effected by means of a solenoid 156.

It will be understood that couching head 96 in the position just described will be carrying a blotter 102 which it will have picked up in station (1).

Air pressure in chamber 69 is now released which causes column 46 and member 44 to drop. This brings the blotter held by the couching head 96 against the wet web already formed on the grid plate. The structure described is such that uniform contact with the whole area of the web is assured.

During the period of contact, which is about one second, the vacuum is maintained in couching head chamber 98 and low air pressure is applied below grid plate 49 through air inlet 54. This action facilitates couching of the wet web onto the blotter.

As previously indicated, while couching head 96 is in couching position, plate transfer head 97 is directly over the plate feeder 138. During the couching period, low air pressure is applied inside cylinder 142 to raise table 139 and a stack of plates 131 to bring the topmost plate against head 97. Vacuum is then applied to chamber 133 to hold the topmost plate in recess 130. As soon as a plate has been so located, air pressure in cylinder 142 is released to lower the table 139 and the remaining stack of plates thereon.

At the end of the simultaneous couching and plate transfer steps, column 46 and its attached components is raised to its upper position. The wet web, couched onto blotter 102 on the couching head, is thus lifted off the wire of the grid plate.

Column section 68 is now rotated an additional 90° in a counter-clockwise direction in order to bring couching head 96 with the couched web and blotter directly over the sheet stacking compartment 147, and plate transfer head 97 with a plate 131 in its recess 130 directly over blotter feeder table 126 with a blotter 102 thereon. Column 46 is now lowered to bring surface 132 of head 97 into contact with the blotter on table 126. Vacuum is applied to chamber 135 in order to hold the blotter on surface 132. Thus, both a plate 131 and blotter 102 are now carried by suction on the head 97.

With column 46 in lower position, vacuum in chamber 98 of the couching head 96 is released simultaneously with the blotter pick-up step just described. This release of vacuum results in dropping of the couched web and blotter into the compartment 147.

Column section 68 now rotates 180° clockwise into its original position (FIG. 1) with the plate transfer head 97 directly over the compartment 147. While in this position, vacuum in chambers 133 and 135 is released which permits both the blotter and plate carried by head 97 to drop into compartment 147 and directly onto a blotter which in turn overlies a wet web. These successive operations comprise one full cycle and provide a stack consisting of the couched web, the blotter employed in couching the web, a second blotter which acts as a press-filler, and a plate 131.

At the completion of sheet-making from all the samples supplied to the machine, the stack in compartment 147 is removed therefrom and the topmost plate on the stack is placed over a blotter on stacking table 148 for reception of the next series of samples. Upon inversion, the removed stack is ready for pressing in accordance with standard procedure.

FIGS. 10 and 11 are illustrative of a suitable electrical wiring arrangement for control of the operation of the machine. The equipment is of generally conventional type and is based on the use of a small programmer 157 and a large programmer 158, which are schematically indicated in FIG. 11.

FIG. 10 includes in its circuit the conveyor motor 9, a motor 159 for the small programmer, a motor 160 for the larger programmer, a counter 161, delay relays 162 and 163, a connection 164 to a vacuum pump relay, and manually controlled switches 165 and 166. The following elements are also included in the circuit, as illustrated:

$S_1$—main on-off switch
$S_2$, $S_3$—cutting switches for beaker conveyor operation
$S_4$—push button start switch
$S_5$—dumper piston 21 switch
$S_6$—counting cam switch
$S_7$—counting cam resetting switch
$S_8$—beaker switch 18
$R_1$—power put relay
$R_2$—conveyor motor relay
$R_3$—ratchet relay
$P_1$—main switch pilot light
$P_2$—large programmer pilot light
$P_3$—small programmer pilot light.

FIG. 11 also includes a schematic representation of the following elements:

stock pump 167,
blotter motor 125,
blotter positioner and stopper solenoids 168,
valve 169 controlling operation of blotter piston 106,
main water supply valve 170,
switch 171 controlling water level in member 44,
valve 172 controlling supply of air to pipe 66,
delay relay 173,
valve 43 of pot 33,
valve 174 controlling flow of spray water in pipe 47,
valve 175 controlling supply of air to air bubbling manifold 63,
control valve 176,
vacuum control valve 177 in hose 99,
solenoid 156,
delay relay 178,
delay relay 179,
column motor 82 reversing relay 180,
column motor 82,
column motor positioning switch 181,
column motor interlock switch 182,
column motor control relay 183,
vacuum control valve 184 in hose 134,
valve 185 controlling intake of plate cylinder 142,
valve 186 controlling vacuum in chamber 136,
control valve 187,
valve 188 in air inlet 54,
vacuum brake valve 189,
filling valve 190 for water tank 28,
stock tank drain valve 41,
valve 191 controlling wash water in pipe 40,
valve 192 controlling vacuum in line 17,
valve 193 controlling operation of dumper piston 21,
drain valve 30,
blotter retainer solenoid 194.

As shown in FIG. 1, electrical power is delivered to the machine by connection 195, clean water is provided by means of supply pipe 196, and air under pressure through line 197. The low pressure air required in various steps as described is obtained from line 197 by means of pressure reducing valve 198 and air pressure indicator 199. The vacuum applied in various phases of the operation by means of the vacuum pump in the cabinet is indicated in the vacuum indicator 200. The programmers 157 and 158 are located in a remotely positioned control panel linked electrically to the machine by means of cable 201.

In a conventional procedure for forming a handsheet for physical testing, a standard bone dry sheet weight for physical testing of $1.20 \pm 0.06$ gms. corresponding to a basis weight of $60 \pm 3$ gm./m.$^2$ is specified. These sheet specifications are achieved by forming the sheet from a dilute 0.15% solids pulp suspension using 800 ml. of the latter plus, in some cases, additional volume to account for losses through the wire.

The machine of the present invention is capable of producing handsheets having a wide range of basis weights including the value of 60 gms./m.$^2$ corresponding to the standard sheet weight. In order to achieve the latter, the machine is so designed that when a 7 gms. bone dry pulp sample contained in a 1000 ml. suspension is supplied to the machine in each beaker, the automatic dilution in mixing tank 27 from dilution tank 28 provides a dilute suspension of 0.15% consistency. The necessary volume of dilute suspension of 800 ml. or more needed for each sheet is provided by pot 33 which has the adjustable sleeve 37 for fixed volume adjustment.

Because of the fixed volumes and dilutions used in the operations carried out by the machine, clearly the bone dry weights of sheets formed will depend upon the consistency of the 1000 ml. sample supplied to the machine in a beaker. Consistency determinations of samples fed to the machine can therefore be calculated from bone dry weighings of sheets formed. Thus, the apparatus can be employed for the forming of handsheets not only for physical testing of pulp but also for the determination of consistency of pulp suspensions supplied at a fixed volume to the machine.

The machine described may be employed as a useful laboratory or "off-line" automatic sheetmaking apparatus for forming handsheets from pulps for physical testing.

The machine may also be employed as an "on-line" apparatus in conjunction with mill operations to provide an automatic means for periodic sampling of pulp suspensions either for pulp quality evaluation or consistency determinations for control work purposes.

For pulp evaluation purposes, it is visualized that periodic "on-line" sheetmaking can be achieved by tapping and delivering a fixed volume of consistency-regulated pulp suspension from the mill supply line and automatically diluting it to 0.15% consistency in the mixing tank prior to sheet forming operations. Additional accessories such as timer operated valves and feed lines to the machine are all that would be required for "on-line" sampling. For "on-line" consistency determination, it is only necessary to provide automatic sampling and delivery of 1000 ml. of suspension and obtaining the bone dry weights of sheets formed.

We claim:

1. Apparatus for producing paper test sheets which comprises a frame, a column mounted in the frame and having a normally vertical axis, an arm fixed to said column and extending radially therefrom, means for imparting rotation to said column for revolution of said arm in a circular path about said axis, said circular pth having arranged therebelow, couching sheet feeding station, a wet paper test sheet feeding station, and a completed test sheet receiving station, said arm having at its free end means forming a vacuum chamber, said chamber having a closed top wall and a flat perforate bottom wall, means for applying a partial vacuum to said chamber, means associated with said rotation imparting means for arresting said rotation at fixed intervals to cause stopping of said arm in succession at each of said stations, means at said couching sheet feeding station for placing an absorbent couching sheet in engagement with said perforate wall for adherence thereto by suction from said chamber, means at said test sheet feeding station for forming wet paper test sheets and for placing one of said wet paper test sheets in engagement with said absorbent couching sheet on said perforate wall for adhesion thereto, means in said frame for supplying in succession aliquots of pulp suspension to said test sheet forming means comprising a horizontally disposed endless conveyor, means for driving said conveyor, a plurality of pulp receiving containers adapted to be positioned in spaced order on said conveyor, means for successively dumping said containers into tank means, and means for supplying said aliquots from said tank means to said paper test sheet forming means, and means including release of vacuum in said chamber for depositing said absorbent couching sheet and said paper test sheet at said test sheet receiving station.

2. Apparatus for producing paper test sheets as defined in claim 1, wherein said means at said couching sheet feeding station comprises a platform, and means for feeding couching sheets in single successive order onto said platform.

3. Apparatus for producing paper test sheets as defined in claim 1, wherein said means at said coaching sheet feeding station comprises a resiliently supported platform, a tray for supporting a stack of said couching sheets, and means for feeding couching sheets from said stack in single successive order onto said platform.

4. Apparatus for producing paper test sheets as defined in claim 1, including means for imparting axial movement to a portion of said column to facilitate entrainment of said couching sheets and said paper tests sheets with said arm.

5. Apparatus for producing paper test sheets as defined in claim 1, said circular path also having arranged therebelow a metal plate feeding station positioned between said test sheet receiving station and said couching sheet feeding station, said column having a second arm fixed thereto in diametrically opposite relation to said first arm, said second arm having suction means for entraining a metal plate at said metal plate feeding station and suction means for entraining an absorbent sheet from said couching sheet feeding station, and means for releasing said suction means to cause deposition of said metal plate and absorbent sheet at said test sheet receiving station.

References Cited

UNITED STATES PATENTS

| 2,645,165 | 7/1953 | Stevens | 162—385X |
| 336,206 | 2/1868 | Breyer | 162—219 |
| 1,291,764 | 1/1919 | Christenot | 198—145 |

OTHER REFERENCES

Stephenson: "Preparation and Treatment of Wood Pulp," in Pulp and Paper Manufacture, McGraw-Hill Book Company, Inc., vol. 1 (1950), p. 1003.

S. LEON BASHORE, Primary Examiner

R. H. TUSHIN, Assistant Examiner

U.S. Cl. X.R.

162—198, 228, 263, 387; 198—155